(12) United States Patent
Susumago

(10) Patent No.: US 7,917,330 B2
(45) Date of Patent: Mar. 29, 2011

(54) SITUATION ANALYZING SYSTEM AND SITUATION ANALYZING METHOD, AND BATCH PROCESSING ANALYZING SYSTEM AND BATCH PROCESSING ANALYZING METHOD

(75) Inventor: Mitsutoshi Susumago, Musashino (JP)

(73) Assignee: Yokogawa Electric Corporation, Musashino-shi (JP)

( * ) Notice: Subject to any disclaimer, the term of this patent is extended or adjusted under 35 U.S.C. 154(b) by 471 days.

(21) Appl. No.: 12/214,169

(22) Filed: Jun. 16, 2008

(65) Prior Publication Data
US 2008/0312873 A1    Dec. 18, 2008

(30) Foreign Application Priority Data

Jun. 15, 2007   (JP) ................................ 2007-158397
Jun. 27, 2007   (JP) ................................ 2007-169214

(51) Int. Cl.
*G06F 15/00*   (2006.01)

(52) U.S. Cl. ..................................................... 702/179

(58) Field of Classification Search .................. 702/179, 702/182–185
See application file for complete search history.

(56) References Cited

U.S. PATENT DOCUMENTS
6,909,993 B2 *   6/2005   Nakao et al. .................. 702/185

FOREIGN PATENT DOCUMENTS
JP            9-281042      10/1997

* cited by examiner

*Primary Examiner* — Edward Raymond
(74) *Attorney, Agent, or Firm* — Westerman, Hattori, Daniels & Adrian, LLP

(57) ABSTRACT

A data accumulating section accumulates the data acquired from the monitored object. A reference space forming section forms a reference space based on the data accumulated in the data accumulating section. A data acquiring section acquires the data from the monitored object. A distance calculating section calculates a Mahalanobis' distance by inputting the data acquired by the data acquiring section into the reference space formed by the reference space forming section. An instruction accepting section accepts an instruction from a user, and decides procedures of operations of the reference space forming section, the data acquiring section, and the distance calculating section in response to the instruction.

12 Claims, 13 Drawing Sheets

FIG. 4A

```
┌─────────────────────────────────────┐
│        MONITORING OPTIONS           │
├─────────────────────────────────────┤
│   ☒  Change of raw data             │
│                                     │
│   ☐  Change of maximum/minimum values│
│                                     │
│   ☐  Change of an average value an hour│
│                                     │
│   ☐  Change of an average value a day │
│                                     │
│                  •                  │
│                  •                  │
│                  •                  │
└─────────────────────────────────────┘
```

81 → (points to "Change of maximum/minimum values" checkbox)

FIG. 4B

```
┌─────────────────────────────────────┐
│        MONITORING OPTIONS           │
├─────────────────────────────────────┤
│   ☒  Change of raw data             │
│                                     │
│   ☒  Change of maximum/minimum values│
│                                     │
│   ☐  Change of an average value an hour│
│                                     │
│   ☐  Change of an average value a day │
│                                     │
│                  •                  │
│                  •                  │
│                  •                  │
└─────────────────────────────────────┘
```

81 → (points to "Change of maximum/minimum values" checkbox)

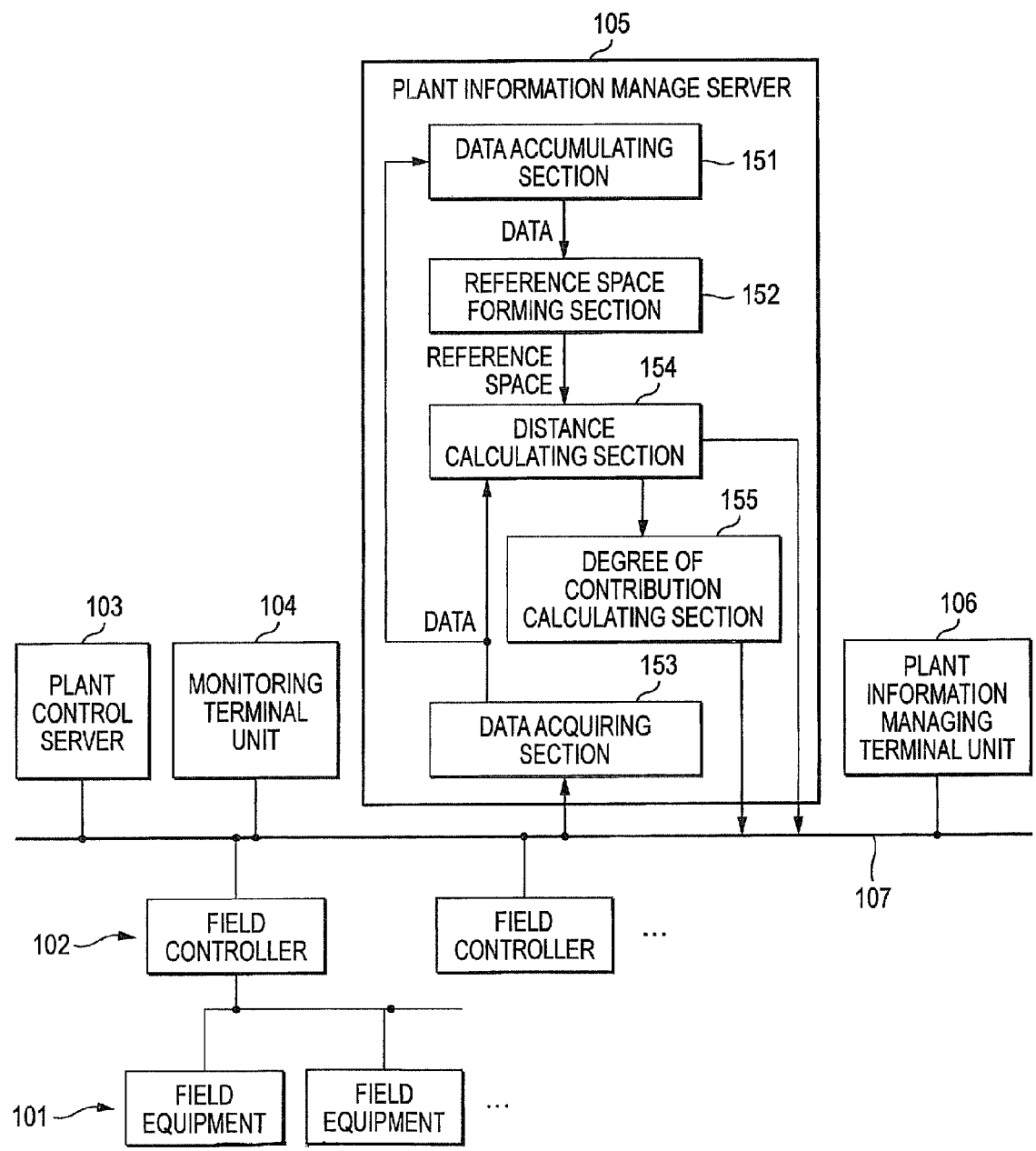

| ITEM | DEGREE OF ABNORMALITY |
|---|---|
| BATCH DATA A | ▨ |
| BATCH DATA B | ▨ |
| BATCH DATA C | ▨▨▨▨▨▨▨▨▨▨▨▨ |

0                                                100%

SITUATION ANALYZING SYSTEM AND SITUATION ANALYZING METHOD, AND BATCH PROCESSING ANALYZING SYSTEM AND BATCH PROCESSING ANALYZING METHOD

TECHNICAL FIELD

The present disclosure relates to a situation analyzing system and a situation analyzing method for analyzing a situation of a monitored object based on data acquired from the monitored object.

Also, the present disclosure relates to a batch processing analyzing system and a batch processing analyzing method for analyzing a situation of a batch processing based on data acquired from the batch processing.

RELATED ART

In the plant, and others, the system for detecting an abnormal event in the plant and generating an alarm has been introduced. Once an alarm is issued in the abnormal event, the operator who caught the abnormal event on a monitor screen checks the equipment from which the alarm is issued, and then determines the cause of such abnormal event. Also, the operator takes the measure to avoid the unordinary condition such as maintenance, or the like when the cause is made clear.

[Patent Literature 1] Japanese Patent Application Publication No. 9-281042

In order to build up such system, an alarm generating logic for detecting the abnormal event in setting up the system must be formed. Also, once the alarm is issued, such actions are required of the operator that not only the equipment in which the abnormal event occurred but also the associated equipments that such operator guesses from the alarm generating logic, the process knowledge, and the past experiences should be checked by looking up the alarm generating logic, and then the adequate operations should be carried out.

In this event, in order to issue the alarm adequately, the operator must make up the complicated alarm generating logic. In order to issue merely the alarm that the operator needs, in many cases the operator must make up the complicated logic, and it is difficult for the operator having little experience to operate the system.

Also, in order to investigate the cause of the abnormal event when the alarm is issued, the operator must check the alarm generating logic. At this time, when the alarm generating logic is complicated, it takes very much time for the operator to investigate the cause. Also, the number of the operators tends to decrease recently, and thus the monitoring information per operator is increased. Therefore, it becomes difficult for the operator to grasp the systems associated with the alarm generation in the overall system.

For this reason, the development of the system that is able to detect the unordinary condition of the plant without preparation of the complicated alarm generating logic or the system that is able to extract quickly the equipment acting as the cause in detecting the abnormal event is strongly needed.

Also, in the process manufacturing industries that manufacture food/drink, chemical product, apparel, petroleum, raw materials, etc., there exist the needs peculiar to these manufacturing industries, and the complicated processes are needed. The manufacturing steps are given as the batch processing that is followed by a series of operations. In monitoring the batch processing, two following methods are employed.

(1) Data Superposition

In order to decide whether or not a change of the data in the current batch processing is normal, the existing data is displayed in trend form and superposed with the ideal batch data, and these data are compared with each other with eyes.

(2) Automatic Comparison

The existing batch processing and the ideal batch data are automatically compared with each other. In this method, the decision using a threshold of a data value or the decision using a threshold of a deviation is made.

In order to build up such system, an alarm generating logic for detecting the abnormal event in setting up the system must be formed. Also, once the alarm is issued, such actions are required of the operator that not only the equipment in which the abnormal event occurred but also the associated equipments that such operator guesses from the alarm generating logic, the process knowledge, and the past experiences should be checked by looking up the alarm generating logic, and then the adequate operations should be carried out.

However, in the method using the data superposition, the superposed data are discriminated by the human's eyes and thus the criterion is unclear. Also, when plural pieces of superposed batch data are compared mutually, there is a risk that a minute difference is overlooked by the visual check. In addition, the number of data that can be compared mutually by using the superposition is limited, and thus it is impossible to compare a large amount of data at a time.

Also, in the method using the automatic comparison, even through the form of data change (trend form) is different, the abnormal event cannot be detected by the decision using the threshold unless the data value is largely distorted, and therefore the operator cannot make the exact decision. Also, it is very troublesome to set the appropriate threshold, and therefore such setting is a heavy burden on the operator's work.

SUMMARY

Exemplary embodiments of the present invention provide a situation analyzing system and a situation analyzing method, capable of analyzing easily and quickly a situation of a monitored object by using the Mahalanobis-Taguchi method.

Also, Exemplary embodiments of the present invention provide a batch processing analyzing system and a batch processing analyzing method, capable of analyzing easily and quickly a situation of a batch processing by using the Mahalanobis-Taguchi method.

A situation analyzing system of the present invention for analyzing a situation of a monitored object based on data acquired from the monitored object, includes a data accumulating section for accumulating the data acquired from the monitored object; a reference space forming section for forming a reference space based on the data accumulated in the data accumulating section; a data acquiring section for acquiring the data from the monitored object; a distance calculating section for calculating a Mahalanobis' distance by inputting the data acquired by the data acquiring section into the reference space formed by the reference space forming section; and an instruction accepting section for accepting an instruction from a user and deciding procedures of operations of the reference space forming section, the data acquiring section, and the distance calculating section in response to the instruction.

According to this situation analyzing system, the situation of the monitored object is analyzed by calculating the Mahalanobis' distance. Therefore, there is no need to form the complicated logic for use in the monitoring or the analysis, and the situation can be analyzed easily and quickly. Also, the user's instruction is accepted and the operational procedures are decided in response to the instruction. Therefore, the user's intention and know-how can be reflected exactly in the situation analysis.

The instruction accepting section may accept an addition or a deletion of data species handled in the reference space forming section, the data acquiring section, and the distance calculating section as the instruction.

The instruction accepting section may accept a designation of forming conditions of the reference space in the reference space forming section as the instruction.

The instruction accepting section may accept a designation of a range of the data, which is used in forming the reference space by the reference space forming section, out of the data accumulated in the data accumulating section as the instruction.

The instruction accepting section may display graphically the data accumulated in the data accumulating section on a screen, and accept the designation of the range of data on a display screen.

The distance calculating section may make a trial possible in compliance with the instruction given by the instruction accepting section, by calculating the Mahalanobis' distance while using the data accumulated in the data accumulating section instead of the data acquired by the data acquiring section.

A situation analyzing method of the present invention of analyzing a situation of a monitored object based on data acquired from the monitored object, includes a step of accumulating the data acquired from the monitored object; a step of forming a reference space based on the data accumulated; a step of acquiring the data from the monitored object; a step of calculating a Mahalanobis' distance by inputting the data acquired in the step of acquiring the data into the reference space formed; and a step of accepting an instruction from a user and deciding procedures of operations in the step of forming the reference space, the step of acquiring the data, and the step of calculating the Mahalanobis' distance in response to the instruction.

According to this situation analyzing method, the situation of the monitored object is analyzed by calculating the Mahalanobis' distance. Therefore, there is no need to form the complicated logic for use in the monitoring or the analysis, and the situation can be analyzed easily and quickly. Also, the user's instruction is accepted and the operational procedures are decided in response to the instruction. Therefore, the user's intention and know-how can be reflected exactly in the situation analysis.

A batch processing analyzing system of the present invention for analyzing a situation of a batch processing based on data acquired from the batch processing, includes a data accumulating section for accumulating data acquired from the batch processing; a reference space forming section for forming a reference space based on the data accumulated in the data accumulating section; a data acquiring section for acquiring the data from the batch processing as the analyzed object; and a distance calculating section for calculating a Mahalanobis' distance by inputting the data acquired by the data acquiring section into the reference space formed by the reference space forming section.

According to this batch processing analyzing system, the situation of the batch processing is analyzed by calculating the Mahalanobis' distance. Therefore, the situation can be analyzed easily and quickly not to rely on the decision made by the visual check.

The reference space forming section may form the reference space that is decided as normal one, based on the data that is accumulated in the data accumulating section and decided as normal one.

The distance calculating section may calculate data of the Mahalanobis' distance in unit of batch processing.

The batch processing analyzing system may further include a degree-of-contribution calculating section for calculating a degree of contribution of the data of the batch processing to the Mahalanobis' distance calculated by the distance calculating section every time.

A batch processing analyzing method of the present invention of analyzing a situation of a batch processing based on data acquired from the batch processing, includes a step of accumulating data acquired from the batch processing; a step of forming a reference space based on the data accumulated; a step of acquiring the data from the batch processing as the analyzed object; and a step of calculating a Mahalanobis' distance by inputting the data acquired in the step of acquiring the data into the reference space formed.

According to this batch processing analyzing method, the situation of the batch processing is analyzed by calculating the Mahalanobis' distance. Therefore, the situation can be analyzed easily and quickly not to rely on the decision made by the visual check.

Other features and advantages may be apparent from the following detailed description, the accompanying drawings and the claims.

BRIEF DESCRIPTION OF THE DRAWINGS

FIGS. 4A, 4B are views showing a display example of a plant information managing terminal unit respectively.

FIG. 8 is a block diagram showing a configuration of another embodiment in which a batch processing analyzing system of the present invention is applied to the plant controlling system.

DETAILED DESCRIPTION

An embodiment of a situation analyzing system according to the present invention will be explained with reference to FIG. 1 to FIG. 7 hereinafter.

Figure 1:
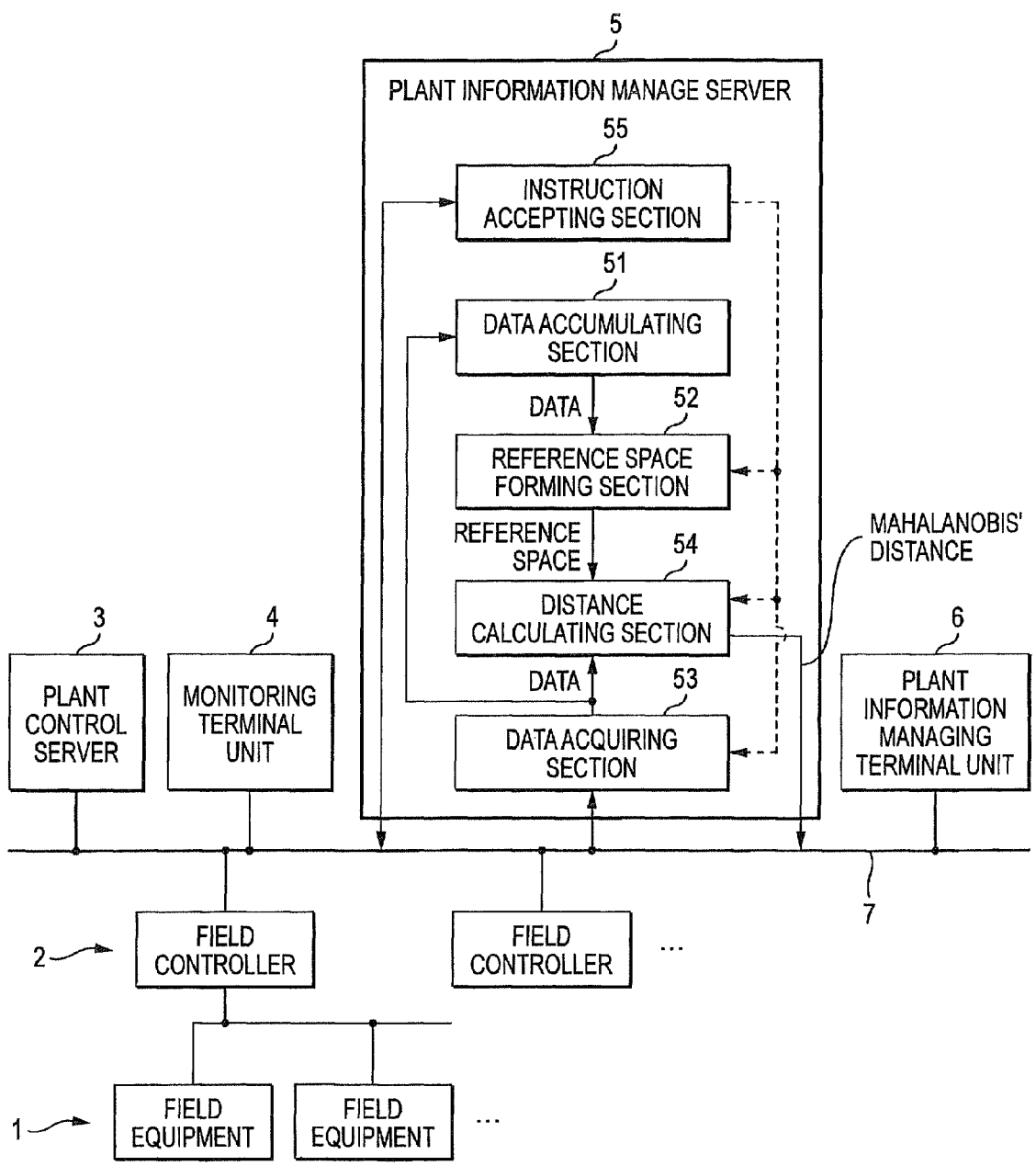
FIG. 1 is a block diagram showing a configuration of an embodiment in which a situation analyzing system of the present invention is applied to the plant controlling system.

FIG. 1 is a block diagram showing a configuration of the plant controlling system to which a situation analyzing system of the present embodiment is applied.

As shown in FIG. 1, the plant controlling system is equipped with field controllers 2, 2, . . . arranged in the plant in a distributed fashion, a plant control server 3 for controlling integrally field equipments 1, 1, . . . via the field controllers 2, 2, . . . , and a monitoring terminal unit 4 for executing a monitoring of the plant. The field controllers 2, 2, . . . and the plant control server 3 are connected mutually via a network 7.

An application program for executing data collection from the field equipments 1, 1, . . . and control to the field equipments 1, 1, . . . is loaded in the plant control server 3. The operator can monitor a situation of the plant via the monitoring terminal unit 4 by running this program.

Also, a plant information manage server 5 constituting the situation analyzing system of the present embodiment, and a plant information managing terminal unit 6 are connected to the plant controlling system via the network 7.

As shown in FIG. 1, the plant information manage server 5 constitutes a data accumulating section 51 for accumulating data obtained from the monitored object, a reference space forming section 52 for forming a reference space based on the data accumulated in the data accumulating section 51, a data acquiring section 53 for acquiring the data from the monitored object, a distance calculating section 54 for calculating a Mahalanobis' distance by inputting the data obtained by the data acquiring section 53 into the reference space formed by the reference space forming section 52, and an instruction accepting section 55 for accepting the instruction from the user and deciding operation procedures of the reference space forming section 52, the data acquiring section 53, and the distance calculating section 54 in response to the instruction.

Figure 2A:
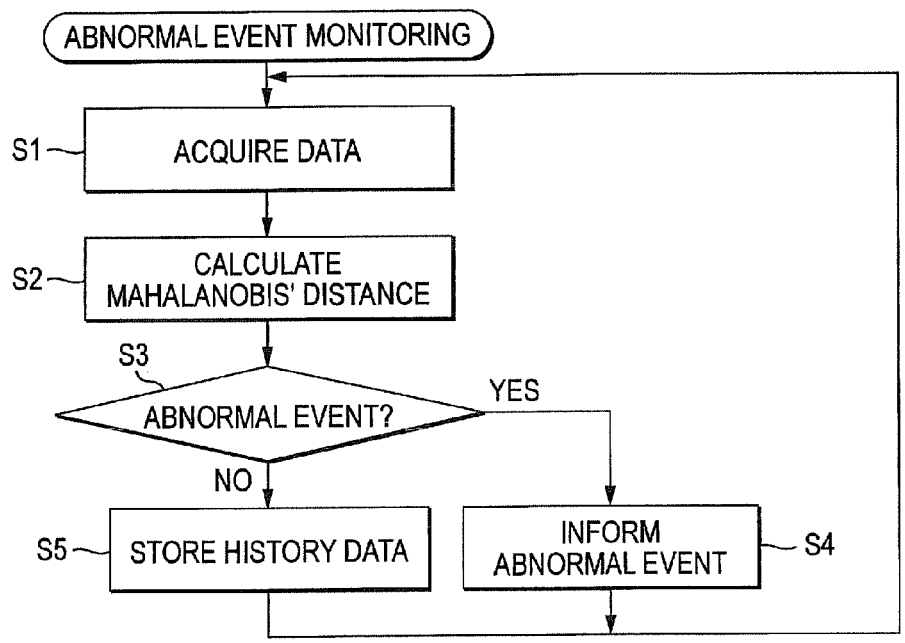
FIGS. 2A-2C are flowcharts showing an operation of the situation analyzing system of the present embodiment respectively.
Figure 2B:
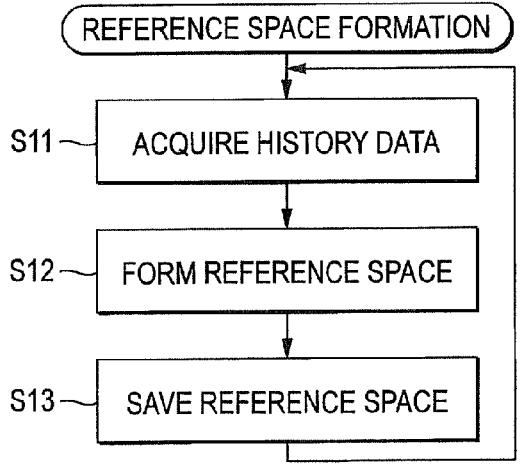
Figure 2C:
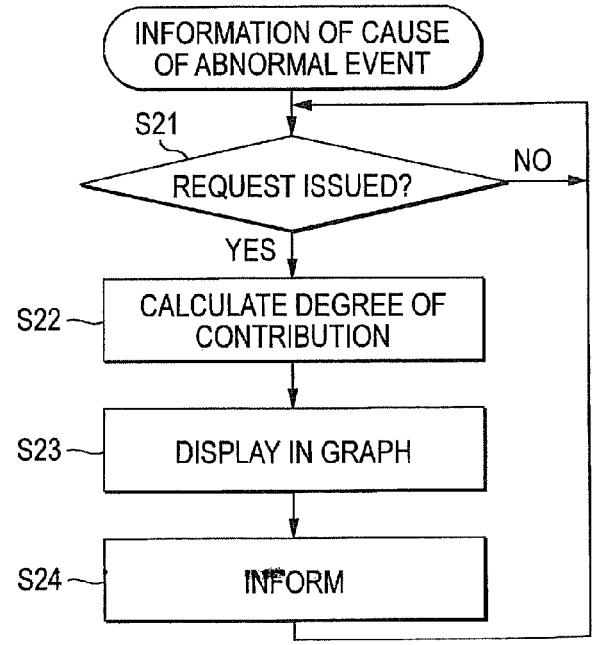

FIGS. 2A-2C are flowcharts showing an operation of the situation analyzing system of the present embodiment respectively.

Step S1 to step S5 in FIG. 2A show operational procedures for monitoring an abnormal event generated in the plant controlling system. These procedures are carried out under control of the plant information manage server 5.

First, in step S1 in FIG. 2A, the data is acquired from the plant control server 3 via the data acquiring section 53. Various parameters collected from the field equipments 1, 1, . . . are contained in the acquired data.

Then, in step S2, the distance calculating section 54 calculates the Mahalanobis' distance by inputting the data acquired in step S1 into the reference space formed by the reference space forming section 52, and also displays the calculated result on a screen of the plant information managing terminal unit 6 in graph.

Then, in step S3, it is decided whether or not the calculated Mahalanobis' distance is longer than a predetermined distance. In this process, the Mahalanobis-Taguchi method is executed to calculate the Mahalanobis' distance between a group of normal data stored in the data accumulating section 51 in a normal period and the data acquired in step S1, and thus similarity between the data acquired in step S1 and a group of normal data is decided.

If the decision in step S3 is Yes, it is decided that the acquired data is abnormal, and then the process goes to step S4. In contrast, if the decision in step S3 is No, it is decided that the acquired data is normal, and then the process goes to step S5.

Figure 3A:
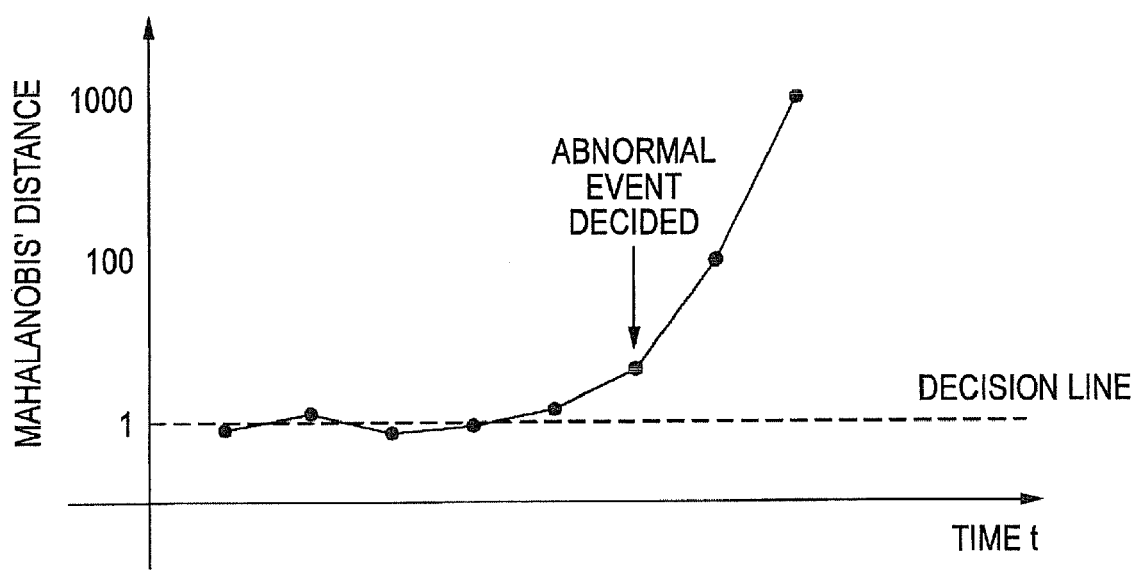
FIG. 3A is a view showing a display example of a calculated result of the Mahalanobis' distance.

FIG. 3A shows a display example of the calculated result of the Mahalanobis' distance. When the Mahalanobis' distance is increased to go away from a decision line, the abnormal event is decided in step S3.

Then, in step S4, the operator is informed of the abnormal event of the plant. Then, the process goes back to step S1.

In contrast, in step S5, the data acquired in step S1 (the normal data) is stored in the data accumulating section 51. Then, the process goes back to step S1. In this manner, only the normal data are stored in the data accumulating section 51.

Step S11 to step S13 in FIG. 2B show procedures of forming the reference space. These procedures are carried out under control of the plant information manage server 5.

First, in step S11 in FIG. 2B, a group of normal data stored in the data accumulating section 51 in a normal period is acquired. Then, in step S12, the reference space forming section 52 forms the reference space based on the group of normal data acquired from the data accumulating section 51. This reference space is used in above step S2.

Then, in step S13, the reference space formed in step S12 is saved. Then, the process goes back to step S11.

In this manner, in the present embodiment, the newest normal data stored sequentially in the data accumulating section 51 can be reflected in the reference space by repeating the formation of the reference space. In this case, the reference space may be updated appropriately not to repeat the formation of the reference space constantly.

According to the present embodiment, depending on the accumulation of the group of normal data (history data) acting as the materials that are used to form the reference space, a decision accuracy of abnormal/normal in step S3 can be improved.

Step S21 to step S24 in FIG. 2C show procedures of informing the cause of abnormal event. These procedures are carried out under control of the plant information manage server 5.

First, in step S21 in FIG. 2C, it is decided whether or not the request for analyzing the cause of occurrence of abnormal event is issued via the plant information managing terminal unit 6. When the operator is informed of the abnormal event of the plant (step S4), such operator can request the plant information manage server 5 via the plant information managing terminal unit 6 to analyze the cause of occurrence of abnormal event. If the decision in step S21 is Yes, the process goes to step S22. In contrast, if the decision in step S21 is No, the process in step S21 is repeated.

Then, in step S22, an extent of contribution to the Mahalanobis' distance (degree of contribution) is calculated with respect to respective parameters as the data acquired from the plant control server 3. In this case, a degree-of-contribution method of calculating a degree of contribution is applied to calculate an extent of the influence of respective parameters used in calculating the Mahalanobis' distance in the Mahalanobis-Taguchi method. Because the degree-of-contribution method is applied, it can be checked which parameter should show the variation different from that in the normal state during a period in which the abnormal event occurred.

Then, in step S23, an extent of the influence of respective parameters is displayed on the screen of the plant information managing terminal unit 6 in graph, based on the degree of contribution calculated in step S22. Since the parameter acting as the cause has the large value shown in graph, the operator can grasp the cause of occurrence of the abnormal event. Also, the degree of influence of not only the parameter having the largest influence but also the parameters associated with this parameter is increased, the operator can grasp the parameters in a range of influence by viewing the graph. For example, when a number of sensors are provided, the operator can grasp the mutual influence among the sensors.

Figure 3B:
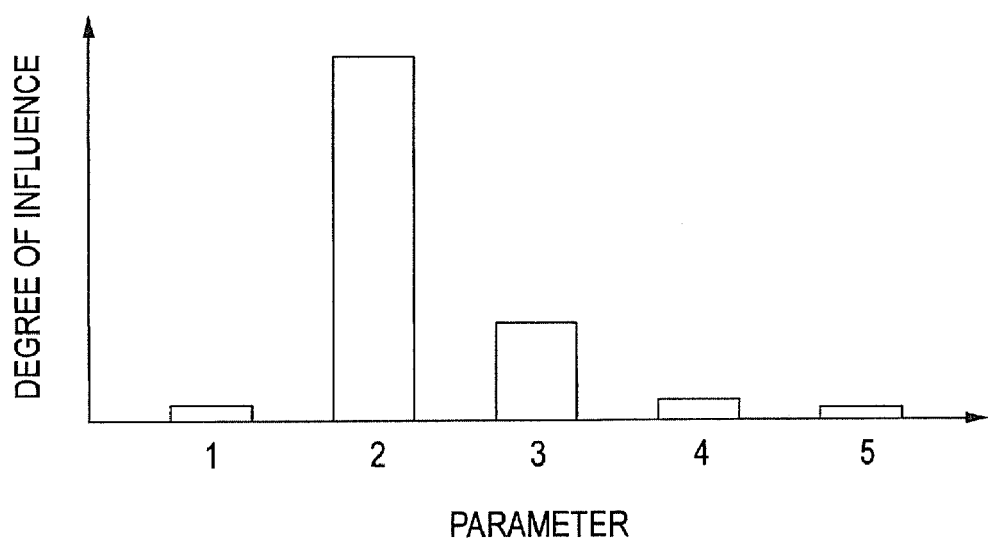
FIG. 3B is a view showing a display example of a degree of influence.

FIG. 3B shows a display example of a degree of influence of each parameter. In this example, it is shown that the degree of influence of Parameter 2 is largest, and the degree of influence of Parameter 3 is next largest.

Then, in step S24, the operator is informed of the equipment name such as the field equipment 1, or the like, which corresponds to the parameter having the largest degree of influence and is considered as the cause of occurrence of the abnormal event, via the screen of the plant information managing terminal unit 6. Then, the process goes back to step S21. At this time, when plural equipments having the large degree of influence exist, the operator is informed of plural names of these equipments. Accordingly, the operator can make the resetting operation, or the like of the informed equipment. Such operation is reflected in the object equipment by the process of the plant control server 3.

In this manner, because the degree-of-contribution method using the Mahalanobis-Taguchi method is applied in analyzing the abnormal event, the candidates of the equipment that is considered as the cause are displayed or informed. Therefore, there is no need to check the complicated alarm generating logic, or the like. As a result, even the operator who is not rich in knowledge of the process and past experience can respond quickly to the abnormal event.

Next, a function of the instruction accepting section 55 will be explained hereunder.

In the situation analyzing system of the present embodiment, when the user's instruction is given via the instruction accepting section 55, the operator can add or delete the data species of the parameter used in the situation analyzing system.

First, the operator accesses the plant information manage server 5 via the plant information managing terminal unit 6. Thus, the operator can check the data species of the parameter used in calculating the Mahalanobis' distance. FIG. 4A shows an example of a screen display of the plant information managing terminal unit 6. In this example, the parameter used in the current monitoring conditions is displayed in "Monitoring options". In the display in FIG. 4A, only the "change of raw data" indicating a change of raw data such as the process value, or the like is chosen as the parameter.

For example, when the operator considered that the monitoring should be done while paying attention to a change of maximum/minimum values of the raw data, the concerned parameter is added to the monitoring conditions by checking a corresponding box 81 on the screen. In the display in FIG. 4B, such an appearance is shown that the "change of maximum/minimum values" is added to the parameter as the new data species. The operator's instruction for adding the parameter is given to the plant information manage server 5, and is reflected in the subsequent monitoring conditions.

In addition to the "change of maximum/minimum values of the raw data", the operator can choose a "change of an average value of the raw data an hour", a "change of an average value of the raw data a day", and the like.

When the parameter is added, the addition of this parameter is reflected in the formation of the reference space in the reference space forming section 52, the data acquired in the data acquiring section 53, and the calculation of the Mahalanobis' distance in the distance calculating section 54.

Also, in the situation analyzing system of the present embodiment, in order to make it possible for the operator to decide whether or not the change of the monitoring condition is effective, the trial can be made under both the monitoring conditions before the change and after the change, by calculating the Mahalanobis' distance in the distance calculating section 54 while using the past data accumulated in the data accumulating section 51 instead of the raw data acquired by the data acquiring section 53. The trial is made in compliance with the operation similar to the actual operation, and the trial result is informed via the plant information managing terminal unit 6.

In this manner, when the situation analysis is tried by using the past data, there is no need to run actually the plant and also simulation of a large number of cases can be done in a short time. Thus, the operator can evaluate appropriately the validity of the monitoring conditions. For example, the operator can know in advance the influence of change such as abnormal event of the Mahalanobis' distance, issuance of another alarm, or the like by the changed setting. When it can be checked that the new monitoring condition is effective, the instruction for adding the parameter is given to the plant information manage server 5 in compliance with the operator's instruction. Thus, the new monitoring condition is reflected actually in the monitoring conditions in the subsequent real-time monitoring.

As described above, in the situation analyzing system of the present embodiment, the operator can check easily the parameter that is used currently in calculating the Mahalanobis' distance by the plant information managing terminal unit 6, and also can do addition/deletion/change of the parameter by the "monitoring options". Also, since the operator can do the trial of the monitoring conditions before and after the change before the actual change, such operator can decide easily whether or not the monitoring conditions after the change is appropriate. Also, since the operator can try the operation after the change of the monitoring conditions, secondary disadvantageous influences caused by the change of the monitoring conditions can be prevented.

Then, in the situation analyzing system of the present embodiment, the operator can designate the forming conditions of the reference space in the reference space forming section 52 by giving the user's instruction via the instruction accepting section 55.

Normally, the operator has the check points that are always checked as the running know-how during the process monitoring. When the reference space is formed based on the operator's check items in this manner, the running know-how of the operator can be reflected effectively in the monitoring conditions.

Figure 5A:
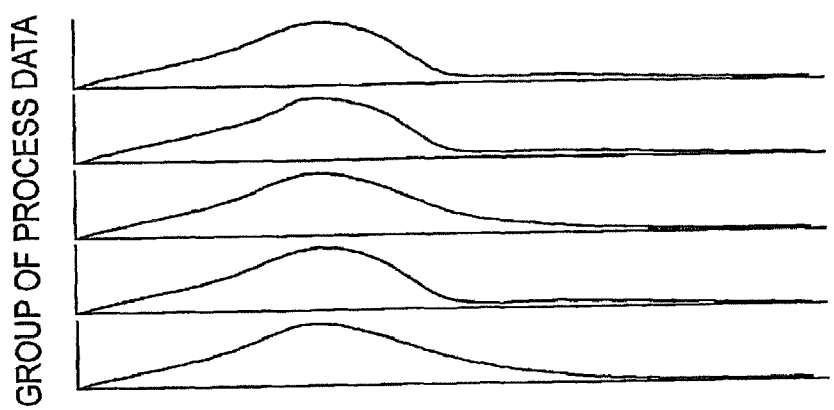
FIGS. 5A-5C are views showing a display example when this system accepts the operator's instruction respectively.
Figure 5B:
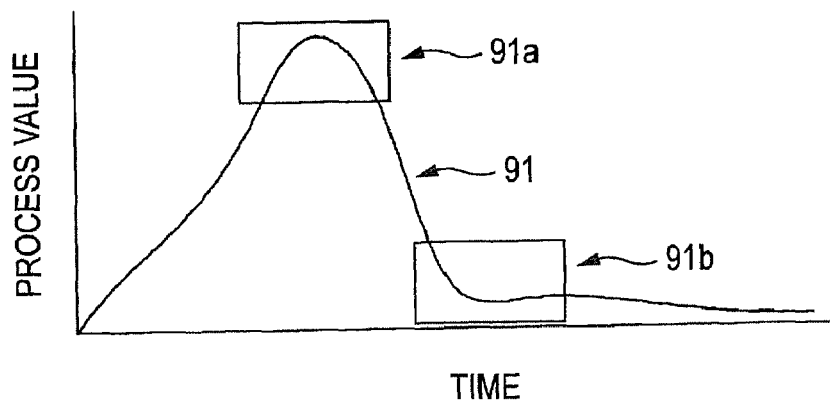

FIG. 5A and FIG. 5B show a display example of the plant information managing terminal unit 6 when this system accepts the operator's instruction respectively. The instruction accepting section 55 causes the plant information managing terminal unit 6 to display a screen that is used to accept the operator's instruction. As shown in FIG. 5A, the operator calls up a group of data (process data), which are decided as normal ones up to now, out of the data accumulated in the data accumulating section 51 on the screen by operating the plant information managing terminal unit 6, and can check whether or not the decision was made correctly. Then, as shown in FIG. 5B, the operator can input an area, which is focused as the operator's criterion, into the curve indicating the change of individual data values. In the example in FIG. 5B, a portion that the operator checked is designated as an area 91*a* and an area 91*b* on a curve 91 that indicates the change of the process data. A method of designating the area can be chosen appropriately and, for example, a range of the curve may be designated by a start point and an end point.

Such operator's criterion is registered in the plant information manage server 5, and is reflected in the forming conditions of the reference space in the reference space forming section 52 (step S11 to step S13). In the example in FIG. 5B, upon forming the reference space in the reference space forming section 52, the reference space is formed by using only the data in the area 91*a* and the area 91*b* of the curve 91. Accordingly, the reference space itself acts in place of the operator's running know-how. Also, since a correlation of plural pieces data is reflected in the reference space, the correlation of respective locations is taken itself into account without input of the correlation even when the designation area is located in plural locations. As a result, the monitoring can be done by a simple inputting operation with high precision.

Figure 6A:
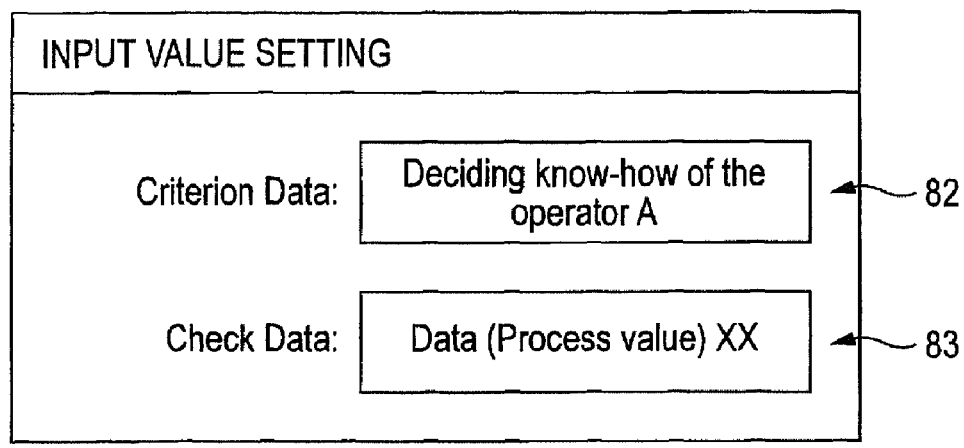
FIG. 6A is a view showing a display example when the operator calls up the operator's criterion.

FIG. 6A shows a screen display of the plant information managing terminal unit 6 when the operator calls up the operator's criterion. In this example, the dialog of "input value setting" is displayed, and the criterion and the data as the decided object can be designated via a box 82 of "criterion data" and a box 83 of "check data" respectively. For example, when "deciding know-how of the operator A" is designated from the box 82, the operator's criterion is chosen. Also, "process data (data XX)" is chosen as the checked object from the box 83. In this manner, the "running know-how of the operator" can be installed appropriately into the monitoring logic as a function. As a result, for example, even when the particular operator is absent, the decision of its operator can be incorporated into the monitoring logic. Also, the criterion that is decided by relying on the operator's sense up to now can be objectified, and thus the operator can make the decision exactly.

Figure 6B:
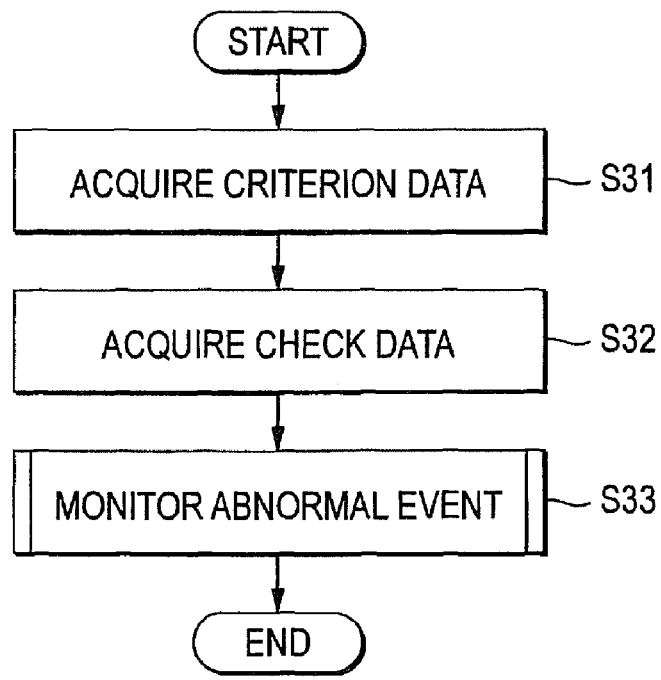
FIG. 6B is a flowchart showing procedures of checking process data in real time.

FIG. 6B is a flowchart showing procedures of checking the process data in real time by using the chosen criterion.

In step S31 in FIG. 6B, the chosen criterion data (FIG. 6A) is acquired. Then, in step S32, the chosen check data (FIG. 6A) is acquired. Then, in step S33, the monitoring of the abnormal event (step S1 to step S5) concerning the checked data acquired in step S32 is carried out in real time, while using the reference space formed in compliance with the criterion data acquired in step S31. Then, the process is ended.

In addition to the process of the monitoring of the abnormal event (step S1 to step S5), the process of informing the cause of the abnormal event (step S21 to step S24) can be carried out by calculating a degree of contribution.

Figure 5C:
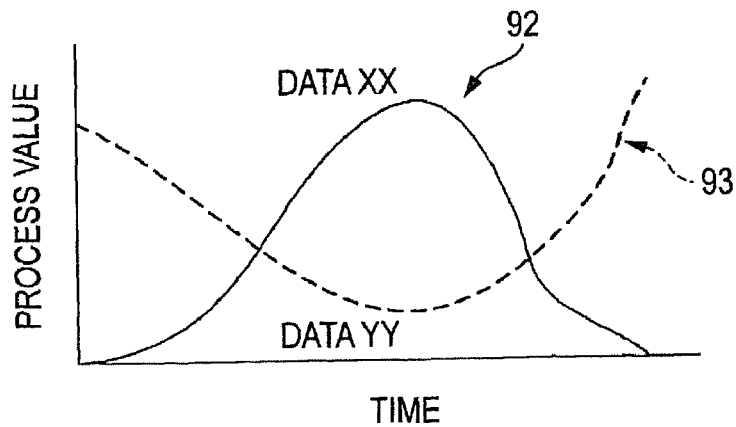

In the situation analyzing system of the present embodiment, the operator's criterion for the correlation among plural pieces of process data can also be registered. FIG. 5C shows a display screen example of the plant information managing terminal unit 6 when this system accepts the input of such criterion. In this example, when the finding "the data YY is decreased during the normal operation when the data XX is increased" is present as the operator's running know-how, the operator can extract only the data YY and the data YY from many pieces of process data by the designation, and display them as a curve 92 and a curve 93 on the screen respectively. Then, the operator designates the process that agrees with the above finding, as the normal data. Such operator's criterion is registered in the plant information manage server 5, and is reflected in the forming conditions of the reference space in the reference space forming section 52 (step S11 to step S13).

Figure 7:
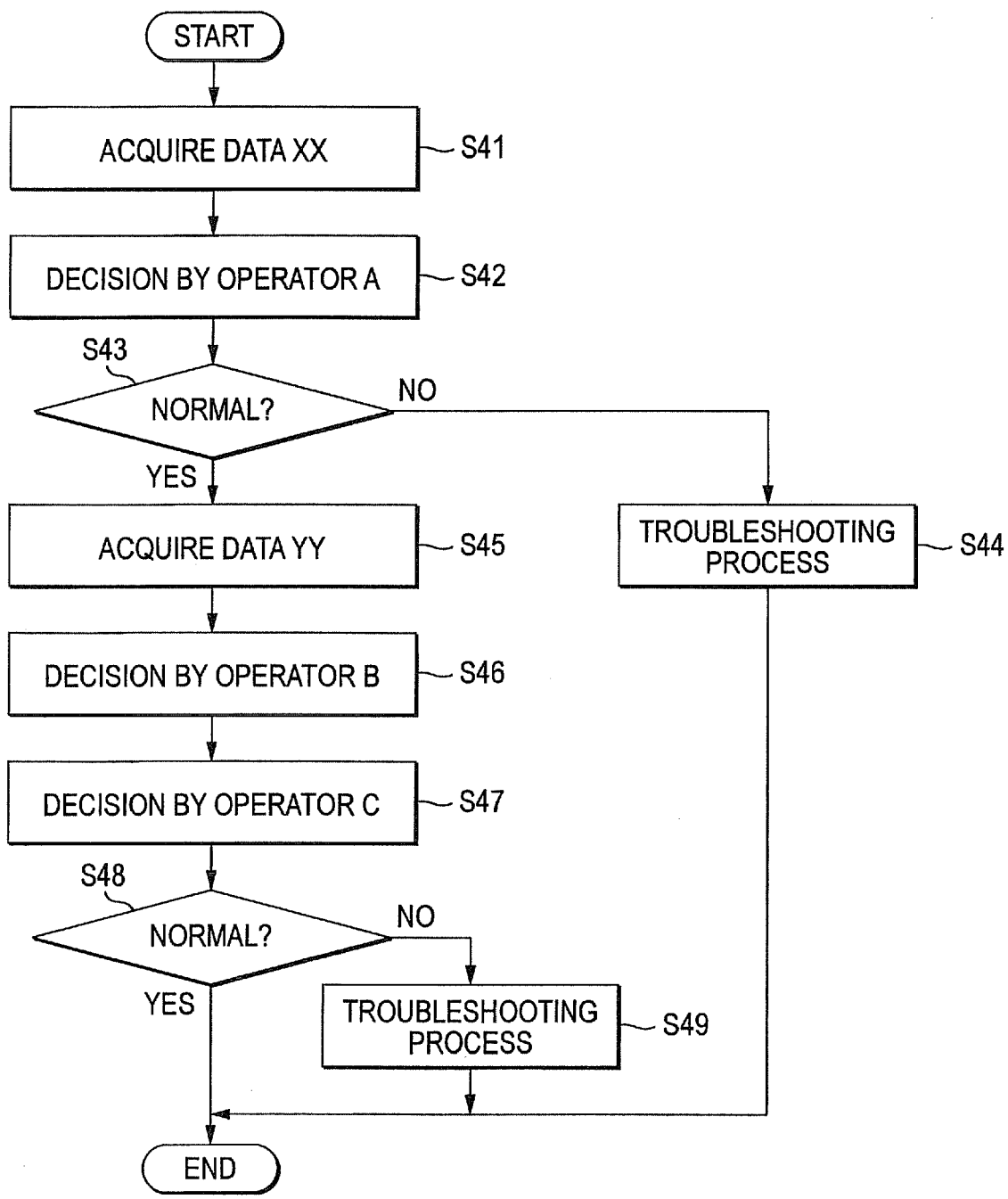
FIG. 7 is a flowchart showing an operation of a monitoring section using a plurality of criteria.

The running know-hows may be combined appropriately by registering plural pieces of running know-hows. FIG. 7 is a flowchart showing monitoring procedures while using a plurality of criteria.

First, in step S41 in FIG. 7, the data XX is acquired. Then, in step S42, the monitoring of the abnormal event (step S33) is carried out in accordance with the criterion of the operator A. Then, in step S43, it is decided whether or not the monitored result is normal. Then, the process goes to step S45 if this decision is Yes, while the process goes to step S44 if this decision is No. Then, in step S44, a predetermined troubleshooting process is executed. Then, the process is ended.

In contrast, in step S45, the data YY is acquired. Then, in step S46, the monitoring of the abnormal event (step S33) is carried out in accordance with the criterion of the operator B. Then, in step S47, the monitoring of the abnormal event (step S33) is carried out in accordance with the criterion of the operator C.

Then, in step S48, it is decided whether or not the monitored result is normal. Then, the process is ended if the decision is Yes, while the process goes to step S49 if the decision is No. Here, if the abnormal event is recognized in either of step S46 and step S47, decision in step S48 is denied.

Then, in step S49, a predetermined troubleshooting process is carried out. Then, the process is ended.

In this manner, the items that each operator checks can be incorporated freely into the monitoring logic. Therefore, even though each operator is absent, the monitoring logic in which respective operator's running know-hows are combined arbitrarily can be built up. Also, it is possible to combine plural operator's running know-hows appropriately.

As described above, in the present embodiment, when the values of data such as the parameters, etc. of respective equipments vary differently from those in the normal operation, the abnormal event is detected by using the Mahalanobis-Taguchi method. Therefore, there is no need that the operator should form the complicated monitoring logic to issue the alarm. Also, since an accuracy in detecting the abnormal event is increased higher as the data in the normal operation are accumulated more and more, the operation for correcting the logic, and the like are also not needed.

Also, in the present embodiment, the "running know-how of the operator" can be installed into the monitoring logic as the function. Thus, even when the operator having the running know-how is absent, the same decision as that made by the operator can be executed. Also, the criterion that is imprecise as the running know-how up to now can be objectified, and thus the same decided result can always be obtained. Also, since the monitoring in the Mahalanobis-Taguchi method is conducted on a basis of the form of data change (trend form), the decision that is close to the operator's sense can be executed.

When the situation analyzing system of the present invention is cooperated with the system that predicts the future variation from the current collected data of the plant, the Mahalanobis' distance based on the future data can be calculated. Accordingly, the operator can be informed of the prediction of the abnormal event prior to the occurrence of the abnormal event, so that the operator can take quickly the countermeasure before the abnormal event occurs and thus the damage can be prevent beforehand. Also, the troublesome operation after the occurrence of the abnormal event and a cost generated due to the abnormal event can be prevented by taking the operation prior to the occurrence of the abnormal event.

As described above, according to the situation analyzing system of the present invention, the situation of the monitored object is analyzed by calculating the Mahalanobis' distance. Therefore, there is no need to form the complicated logic for use in the monitoring or the analysis, and the situation can be analyzed easily and quickly. Also, the user's instruction can be accepted, and procedures of the operation are decided in compliance with this instruction. Therefore, the user's intention and the user's know-how can be reflected exactly in the situation analysis.

Application fields of the present invention are not limited to the above embodiment. The present invention is not limited to the monitoring or the analysis of the plant, and can be applied widely to the scene where the analysis is made based on the data from the monitored object. Also, the present invention is not limited to the abnormal/normal decision, and can be applied widely to various analyses.

Next, an embodiment of a batch processing analyzing system according to the present invention will be explained with reference to FIG. 8 to FIG. 13 hereinafter.

FIG. 8 is a block diagram showing a configuration of the plant controlling system to which a batch processing analyzing system of an embodiment of the present invention is applied.

As shown in FIG. 8, the plant controlling system is equipped with field controllers 102, 102, . . . arranged in the plant in a distributed fashion, a plant control server 103 for controlling integrally field equipments 101, 101, . . . via the field controllers 102, 102, . . . , and a monitoring terminal unit 104 for executing a monitoring of the plant. The field controllers 102, 102, . . . and the plant control server 3 are connected mutually via a network 107.

An application program for executing data collection from the field equipments 101, 101, . . . and control to the field equipments 101, 101, . . . is loaded in the plant control server 103. The operator can monitor a situation of the plant via the monitoring terminal unit 104 by running this program.

Also, a plant information manage server 105 constituting the batch processing analyzing system of the present embodiment, and a plant information managing terminal unit 106 are connected to the plant controlling system via the network 107.

As shown in FIG. 8, the plant information manage server 105 has a data accumulating section 151 for accumulating batch data obtained from the batch processing, a reference space forming section 152 for forming the reference space based on the batch data accumulated in the data accumulating section 151, a data acquiring section 153 for acquiring the batch data from the batch processing as the analyzed object, a distance calculating section 154 for calculating the Mahalanobis' distance by inputting the batch data obtained in the data acquiring section 153 into the reference space formed by the reference space forming section 152, and a degree-of-contribution calculating section 155 for calculating a degree of contribution of the batch data of the batch processing.

Figure 9A:
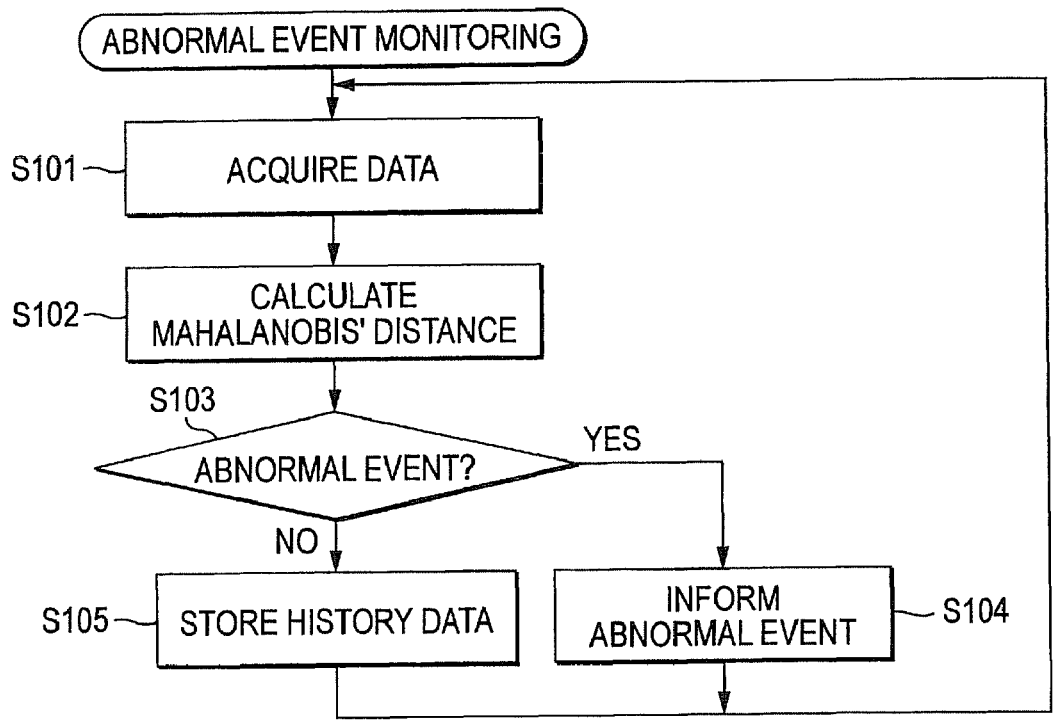
FIGS. 9A, 9B are flowcharts showing an operation of the batch processing analyzing system of the present embodiment respectively.
Figure 9B:
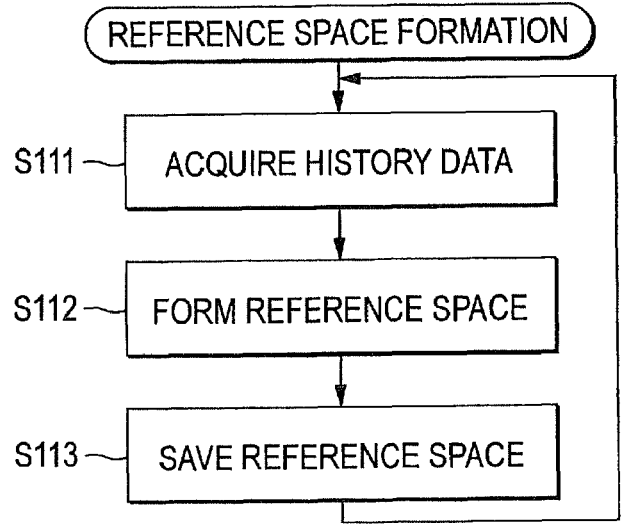

FIGS. 9A and 9B are flowcharts showing an operation of the batch processing analyzing system of the present embodiment respectively.

Step S101 to step S102 in FIG. 9A show operational procedures for monitoring the abnormal event generated in the plant controlling system. These procedures are executed under control of the plant information manage server 105 subsequent to the start of the batch processing.

In step S101 in FIG. 9A, the batch data is acquired from the plant control server 103 via the data acquiring section 153. Various process data collected from the field equipments 101, 101, . . . are contained in the acquired data.

Then, in step S102, the distance calculating section 154 calculates the Mahalanobis' distance by inputting the batch data acquired in step S101 into the reference space formed by the reference space forming section 152, and also displays the calculated result on a screen of the plant information managing terminal unit 106 in graph.

Then, in step S103, it is decided whether or not the calculated Mahalanobis' distance is longer than a predetermined distance. In this process, the Mahalanobis-Taguchi method is executed to calculate the Mahalanobis' distance between a group of normal data stored in the data accumulating section 151 in a normal period and the data acquired in step S101, and thus similarity between the data acquired in step S101 and a group of normal data is decided.

If the decision in step S103 is Yes, it is decided that the acquired data is abnormal, and then the process goes to step S104. In contrast, if the decision in step S103 is No, it is decided that the acquired data is normal, and then the process goes to step S105. In this case, a threshold value of the Mahalanobis' distance used to decide the abnormal event may be set by the operator.

Figure 10:
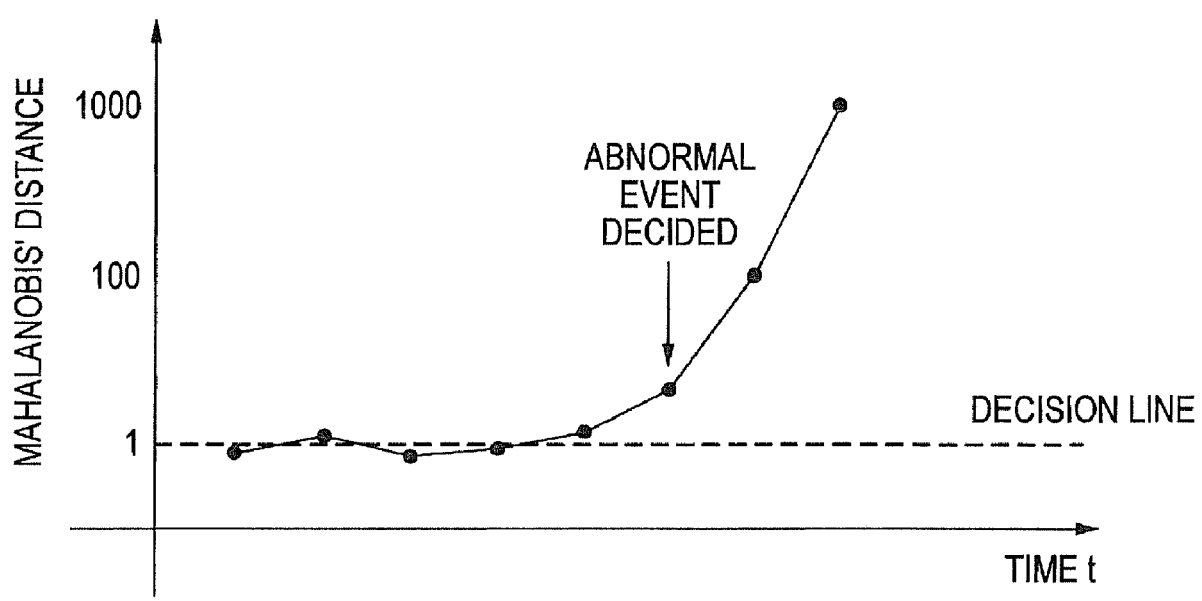
FIG. 10 is a view showing a display example of a calculated result of the Mahalanobis' distance.

FIG. 10 shows a display example of a calculated result of the Mahalanobis' distance in graph. When the Mahalanobis' distance is increased to exceed the decision line, the abnormal event is decided in step S103.

Then, in step S104, the operator is informed of the abnormal event of the plant. Then, the process goes back to step S101.

In contrast, in step S105, the batch data acquired in step S101 (the normal data) is stored in the data accumulating section 151. Then, the process goes back to step S101. In this manner, only the normal data are stored in the data accumulating section 151.

Step S111 to step S113 in FIG. 9B show procedures of forming the reference space. These procedures are executed under control of the plant information manage server 105.

First, in step S111 in FIG. 9B, a group of normal data stored in the data accumulating section 151 in a normal period is acquired. Then, in step S112, the reference space forming section 152 forms the reference space based on the group of normal or ideal data acquired from the data accumulating section 151. A group of these data may be designated by the operator or a group of normal data may be accumulated automatically in the data accumulating section 151. An accuracy in deciding the abnormal/normal states in step S103 can be improved according to the accumulation of a group of normal data as the material constituting the reference space. This reference space is used in above step S102.

Then, in step S113, the reference space formed in step S112 is saved. Then, the process goes back to step S111.

In this manner, in the present embodiment, the newest normal data stored sequentially in the data accumulating section 151 can be reflected in the reference space by repeating the formation of the reference space. In this case, the reference space maybe updated appropriately not to repeat the formation of the reference space constantly.

In the batch processing analyzing system of the present embodiment, not only the abnormal event of the batch processing in the progress can be informed, but also the analyzed result can be displayed on the screen of the plant information managing terminal unit 106 by conducting the analysis of the already-ended batch processings.

Ideally the batch data of the same type batch processing give always the same data. However, the actual batch data have a deviation from the normal or ideal data. A degree of abnormality of each batch data can be grasped as the Mahalanobis' distance calculated for respective data.

Figures 11A, 11B:
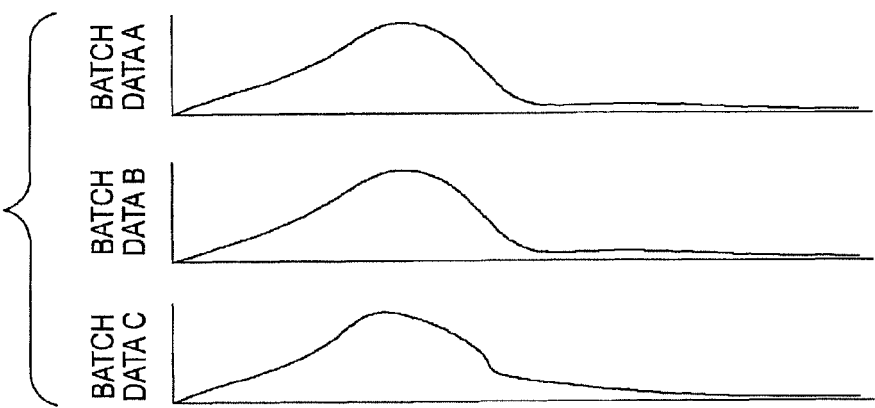
FIG. 11A is view showing plural pieces of batch data of the same type.
FIG. 11B is a view showing an example of a display screen showing a degree of abnormal event of respective batch data, based on the Mahalanobis' distance calculated from respective batch data.

In the batch processing analyzing system of the present embodiment, respective degrees of abnormality of plural pieces of same type batch data are analyzed as the Mahalanobis' distance, and displayed on the screen of the plant information managing terminal unit 106 in graph. As shown in FIG. 11A, batch data A, batch data B, and batch data C obtained from plural pieces of same type batch processings have a deviation from the normal or ideal data respectively.

FIG. 11B shows an example of a display screen showing a degree of abnormal event of respective batch data, based on the Mahalanobis' distance calculated from respective batch data. In the example in FIG. 11B, a degree of abnormality of each batch data is shown in graph, and it is seen that a degree of abnormality of the batch data C is higher than the batch data A and the batch data B. In this manner, in the batch processing analyzing system of the present embodiment, plural pieces of batch data can be analyzed at the same time. In the example in FIG. 11B, the Mahalanobis' distance is displayed as a degree of abnormal event of each batch data not to make the operator aware of the Mahalanobis' distance. In this event, the Mahalanobis' distance of each batch data may be directly displayed.

Also, in the batch processing analyzing system of the present embodiment, a degree of influence of individual batch data on the abnormal event is calculated every time zone, and then displayed on the screen of the plant information managing terminal unit 106.

Also, in the batch processing analyzing system of the present embodiment, when calculation of a degree of influence of the batch data is requested via the plant information managing terminal unit 106, the degree-of-contribution calculating section 155 (FIG. 8) calculates an extend of contribution to the Mahalanobis' distance (degree of contribution) of the batch data every time zone. Then, the calculated degree of contribution is displayed as the degree of contribution. In this case, a degree-of-contribution method of calculating a degree of contribution is applied to calculate an extent of the influence of respective parameters used in calculating the Mahalanobis' distance in the Mahalanobis-Taguchi method. A time zone acting as the cause of the occurrence of abnormal event can be specified by applying the degree-of-contribution method to the data every time zone.

Figure 12:
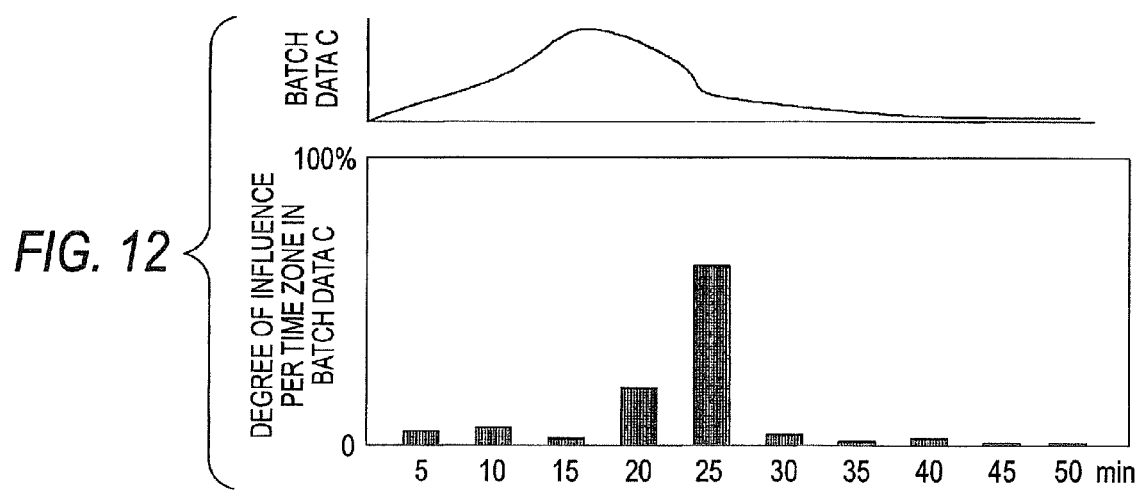
FIG. 12 is a view showing an example of a screen display of a degree of influence in every time zone.

FIG. 12 is a view showing an example of a screen display of a degree of influence in every time zone. In this example, as to the batch data C (FIG. 11B) having a high degree of abnormality, a degree of influence associated with a time zone is displayed. In this way, since a degree of influence of the batch data can be grasped every time zone, the operator can analyze easily the cause or the mechanism of the occurrence of abnormal event. In this case, a degree of contribution associated with a time zone may be displayed directly as a degree of influence in place of a degree of contribution.

As described above, in the batch processing analyzing system of the present embodiment, a similarity between the particular batch data and the normal or ideal batch data can be expressed as a numerical value by calculating the Mahalanobis' distance. Therefore, the objective and exact decision can be made unlike the visual check. No check is required of the operator because of employment of the data superposition.

Also, there is no need to set upper and lower limits, and the like as in the threshold decision method, and only the decision of the batch data serving as the standard is required. Since respective changes can be compared mutually by the Mahalanobis-Taguchi method via the form of data change, a small change of the value that the threshold setting is difficult to catch can be caught.

Also, the number of comparable data is restricted in the data superposition. According to the present invention, many pieces of batch data can be analyzed simultaneously by calculating the Mahalanobis' distance and a degree of contribution at a time.

Meanwhile, the running aiding system that aids the plant operation by executing the step monitoring and the running monitoring of the batch processing has a function of monitoring the steady-state running and a function of monitoring the unsteady-state running. Therefore, the batch processing analyzing method of the present invention can be incorporated into such system as the monitoring logic.

Figure 13:
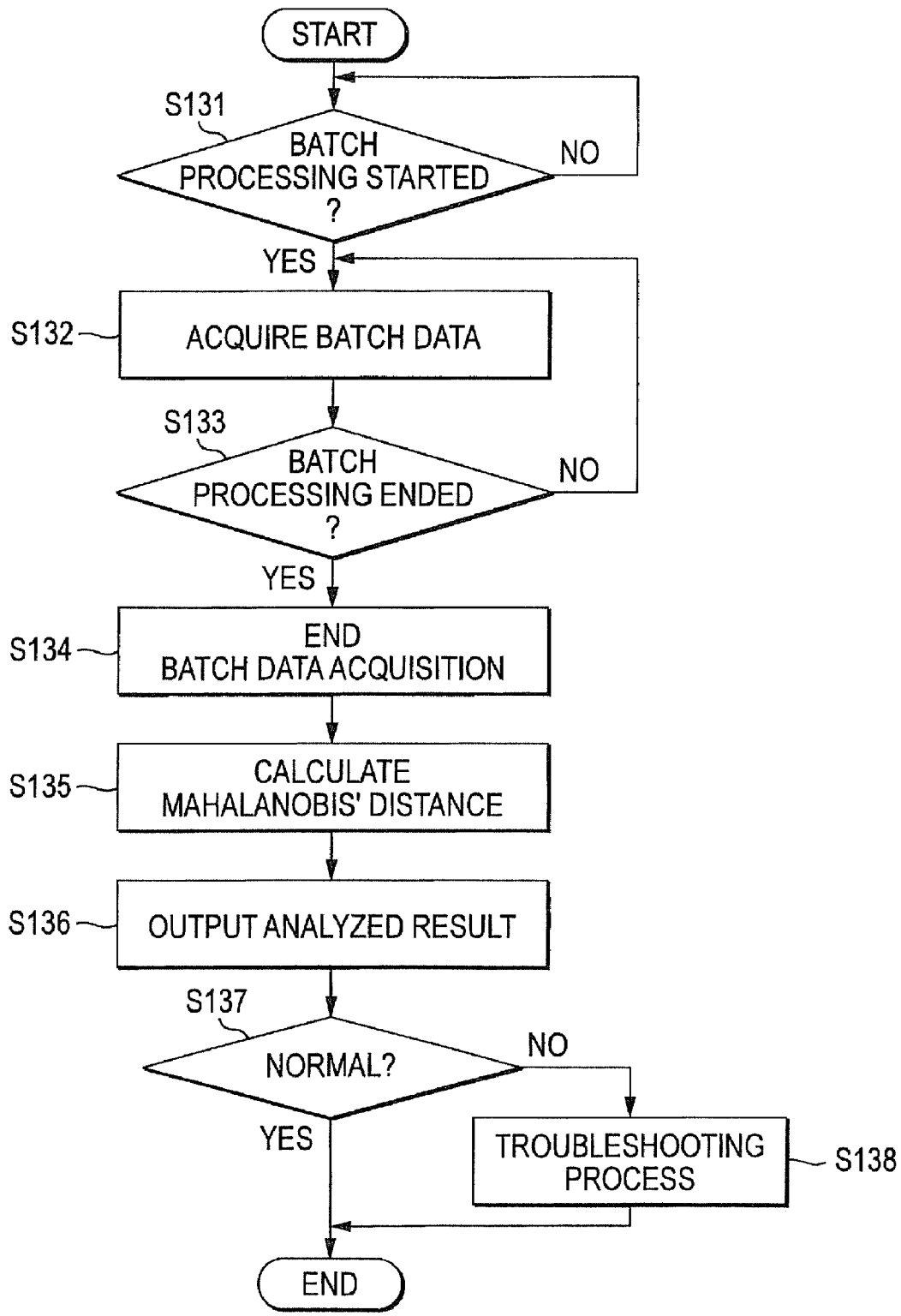
FIG. 13 is a flowchart showing an operational example when the batch processing analyzing method of the present invention is incorporated as the monitoring logic of a running aiding system.

FIG. 13 is a flowchart showing an operational example when the batch processing analyzing method of the present invention is incorporated as the monitoring logic of the running aiding system.

First, in step S131 in FIG. 13, the batch starting event is generated in the plant control system, and the running aiding system is informed of this event. Then, the process goes to step S132.

Then, in step S132, the acquisition of the batch data is executed. Then, step S133, it is decided whether or not the batch ending event is generated in the plant control system, and the running aiding system is informed of this event. If this decision is Yes, the process goes to step S134 where the acquisition of the batch data is ended. If this decision is No, the acquisition of the batch data is continued in step S133.

Then, in step S135, the Mahalanobis' distance is calculated by inputting the acquired batch data into the reference space that has already been formed. In this case, the reference space is formed based on the normal or ideal batch data that have registered beforehand. Then, in step S136, the analysis of the batch data is executed in compliance with the operator's instruction, and then the analyzed result is output. Then, the process is ended. The calculation of the degree of contribution per time zone is contained in the analysis of the batch data.

In this manner, when the batch processing analyzing method of the present invention is applied to the running aiding system, the step monitoring and the running monitoring in the batch processing can be carried out easily and exactly. As the result of this analysis, when it is decided that the batch processing is abnormal, the plant control system, and other systems may be informed of the event. Also, the operator may be informed of the abnormal event via the mail or the alarm.

As described above, according to the batch processing analyzing system of the present invention, the situation of the batch processing is analyzed by calculating the Mahalanobis' distance. Therefore, the situation can be analyzed easily and quickly not to rely on the decision made by the visual check.

The application scope of the present invention is not restricted to the above embodiments. The present invention can be applied widely to the scene where the analysis is needed based on the data from the batch processing.

What is claimed is:

1. A situation analyzing system for analyzing a situation of a monitored object based on data acquired from the monitored object, comprising:

a data accumulating section for accumulating the data acquired from the monitored object;

a reference space forming section for forming a reference space based on the data accumulated in the data accumulating section;

a data acquiring section for acquiring the data from the monitored object;

a distance calculating section for calculating a Mahalanobis' distance by inputting the data acquired by the data acquiring section into the reference space formed by the reference space forming section; and an instruction accepting section for accepting an instruction from a user and deciding procedures of operations of the reference space forming section, the data acquiring section, and the distance calculating section in response to the instruction.

2. A situation analyzing system according to claim 1, wherein the instruction accepting section accepts an addition or a deletion of data species handled in the reference space forming section, the data acquiring section, and the distance calculating section as the instruction.

3. A situation analyzing system according to claim 1, wherein the instruction accepting section accepts a designation of forming conditions of the reference space in the reference space forming section as the instruction.

4. A situation analyzing system according to claim 3, wherein the instruction accepting section accepts a designation of a range of the data, which is used in forming the reference space by the reference space forming section, out of the data accumulated in the data accumulating section as the instruction.

5. A situation analyzing system according to claim 4, wherein the instruction accepting section displays graphically the data accumulated in the data accumulating section on a screen, and accepts the designation of the range of data on a display screen.

6. A situation analyzing system according to claim 1, wherein the distance calculating section makes a trial possible in compliance with the instruction given by the instruction accepting section, by calculating the Mahalanobis' distance while using the data accumulated in the data accumulating section instead of the data acquired by the data acquiring section.

7. A situation analyzing method of analyzing a situation of a monitored object based on data acquired from the monitored object, comprising:
   a step of accumulating the data acquired from the monitored object;
   a step of forming a reference space based on the data accumulated;
   a step of acquiring the data from the monitored object;
   a step of calculating a Mahalanobis' distance by inputting the data acquired in the step of acquiring the data into the reference space formed; and
   a step of accepting an instruction from a user and deciding procedures of operations in the step of forming the reference space, the step of acquiring the data, and the step of calculating the Mahalanobis' distance in response to the instruction.

8. A batch processing analyzing system for analyzing a situation of a batch processing based on data acquired from the batch processing, comprising:
   a data accumulating section for accumulating data acquired from the batch processing;
   a reference space forming section for forming a reference space based on the data accumulated in the data accumulating section;
   a data acquiring section for acquiring the data from the batch processing as an analyzed object; and
   a distance calculating section for calculating a Mahalanobis' distance by inputting the data acquired by the data acquiring section into the reference space formed by the reference space forming section.

9. A batch processing analyzing system according to claim 8, wherein the reference space forming section forms the reference space that is decided as normal one, based on the data that is accumulated in the data accumulating section and decided as normal one.

10. A batch processing analyzing system according to claim 8, wherein the distance calculating section calculates data of the Mahalanobis' distance in unit of batch processing.

11. A batch processing analyzing system according to claim 8, further comprising:
    a degree-of-contribution calculating section for calculating a degree of contribution of the data of the batch processing to the Mahalanobis' distance calculated by the distance calculating section every time.

12. A batch processing analyzing method of analyzing a situation of a batch processing based on data acquired from the batch processing, comprising:
    a step of accumulating data acquired from the batch processing;
    a step of forming a reference space based on the data accumulated;
    a step of acquiring the data from the batch processing as an analyzed object; and
    a step of calculating a Mahalanobis' distance by inputting the data acquired in the step of acquiring the data into the reference space formed.

* * * * *